(12) United States Patent
Dimaunahan et al.

(10) Patent No.: US 10,885,551 B2
(45) Date of Patent: Jan. 5, 2021

(54) SYSTEM AND METHODS FOR DEFINING AND DETERMINING ELIGIBILITY FOR PROMOTION FOR USERS OF MULTI TENANT PLATFORM

(71) Applicant: NETSUITE INC., San Mateo, CA (US)

(72) Inventors: Alfredo Dimaunahan, Manila (PH); Donnabelle Embuscado, Taguig (PH); Yukte Oberoi, Santa Clara, CA (US); Sean Kennedy, San Mateo, CA (US); Brad Stoutimore, San Francisco, CA (US)

(73) Assignee: NETSUITE INC., San Mateo, CA (US)

( * ) Notice: Subject to any disclaimer, the term of this patent is extended or adjusted under 35 U.S.C. 154(b) by 820 days.

(21) Appl. No.: 14/262,447

(22) Filed: Apr. 25, 2014

(65) Prior Publication Data

US 2017/0236152 A1 Aug. 17, 2017

Related U.S. Application Data

(60) Provisional application No. 61/816,920, filed on Apr. 29, 2013.

(51) Int. Cl.
*G06Q 30/02* (2012.01)

(52) U.S. Cl.
CPC .............................. *G06Q 30/0253* (2013.01)

(58) Field of Classification Search
None
See application file for complete search history.

(56) References Cited

U.S. PATENT DOCUMENTS

| | | | |
|---|---|---|---|
| 6,873,968 B2 | 3/2005 | Ehrlich et al. | |
| 8,204,799 B1 | 6/2012 | Murray et al. | |
| 8,577,740 B1 | 11/2013 | Murray et al. | |
| 9,075,687 B1 | 7/2015 | Liu et al. | |
| 9,509,571 B1 | 11/2016 | Liu | |
| 2004/0249497 A1* | 12/2004 | Saigh | E04H 14/00 700/216 |
| 2008/0175222 A1* | 7/2008 | Barnea | H04L 29/12594 370/351 |

* cited by examiner

*Primary Examiner* — Abhishek Vyas
*Assistant Examiner* — Darnell A Pouncil
(74) *Attorney, Agent, or Firm* — Kraguljac Law Group, LLC

(57) ABSTRACT

A system and associated methods for enabling a tenant of a multi-tenant platform to customize the promotional functions of the tenant's eCommerce website which is hosted on the multi-tenant platform. The promotional offer(s) may be configured to suit the tenant's short term and/or long term business needs, such as to encourage purchase of a particular product or service at a particular time, to encourage a purchase in response to a particular business event or situation, to encourage a purchase in response to a particular action or lack of action by the consumer, to encourage a purchase in response to a particular inventory level or revenue amount of the tenant, to encourage a purchase in response to determining that the consumer was the object of a sales pitch from one of the tenant's salespeople, etc.

14 Claims, 9 Drawing Sheets

SYSTEM AND METHODS FOR DEFINING AND DETERMINING ELIGIBILITY FOR PROMOTION FOR USERS OF MULTI TENANT PLATFORM

CROSS REFERENCE TO RELATED APPLICATION

This application claims the benefit of U.S. Provisional Application No. 61/816,920, entitled "System and Method for Using Saved Search to Determine Eligibility and Discount Rule for Promotion," filed Apr. 29, 2013, which is incorporated herein by reference in its entirety (including the Appendix) for all purposes.

BACKGROUND

The ability of businesses to conduct transactions with customers, as well as with other businesses, over the Internet using eCommerce "online storefronts" has enabled such businesses to greatly expand their potential customer base while substantially reducing costs related to maintaining "brick and mortar" store fronts. In addition to the advantages related to customer access created by the Internet, the ability of business users to access crucial business information has been greatly enhanced by the proliferation of IP-based networking together with advances in object oriented Web-based programming and browser technology. Using these advances, systems have been developed that permit web-based access to business information systems, thereby allowing a user with a browser and an Internet or intranet connection to view, enter, or modify the required business information. For example, substantial efforts have been directed to Enterprise Resource Planning (ERP) systems that integrate the capabilities of several historically separate business computing systems into a common system, with a view toward streamlining business processes and increasing efficiencies on a business-wide level. By way of example, the capabilities or modules of an ERP system can include: accounting, order processing, time and billing, inventory management, employee management/payroll, and employee calendaring and collaboration, as well as reporting and analysis capabilities relating to these functions.

In a related movement, substantial efforts have also been directed to integrated Customer Relationship Management (CRM) systems, with a view toward obtaining a better understanding of customers, enhancing service to existing customers, and acquiring new, profitable customers. By way of example, the capabilities or modules of a CRM system can include: sales force automation (SFA), marketing automation, contact list, call center support, and web-based customer support, as well as reporting and analysis capabilities relating to these functions. With differing levels of overlap with ERP/CRM initiatives and with each other, substantial efforts have also been directed toward development of increasingly integrated partner and vendor management systems, web store/eCommerce systems, product life-cycle management (PLM) systems, and supply chain management (SCM) systems.

Rather than build such integrated business systems and maintain the relatively costly infrastructure and components, merchants may desirably utilize systems/platforms provided by third parties. Such third parties may implement an integrated business system as described above in the context of a multi-tenant platform, wherein individual instantiations of a single comprehensive integrated business system are provided to a variety of merchants, or tenants. A key advantage to such multi-tenant platforms is the ability for each tenant to customize their instantiation of the integrated business system to that tenant's specific business needs.

An eCommerce platform or application that is operated as a service for a tenant of a multi-tenant platform (or as a dedicated web-service for a single merchant) is configured to represent and implement the business model and operational aspects of the business desired by the merchant. As such, one merchant may have different business goals or practices than another merchant that is also utilizing an eCommerce platform or application. Thus, a merchant may desire to implement certain customized features, services, or functions of the eCommerce platform that represents their business model. And, one merchant may wish to implement different customized features, services, or functions on their eCommerce platform than those implemented by another merchant.

One area in which a merchant may wish to customize the features, services, or functions of its eCommerce platform, is with regards to the promotional offers (such as discounts, rebates, loyalty programs, incentives to purchase one or more products or services, etc.) that it presents to consumers. In addition, a merchant may wish to enable a consumer to receive some form of promotional offer based on products or services that the consumer has looked at, but not yet decided to purchase. Further, as noted, the operator of a multi-tenant computing platform that includes eCommerce functionality may wish to enable a tenant to make the type and operational characteristics of the promotions offered by the tenant's eCommerce application suit the business needs of that tenant, which may include consideration of the tenant's current inventory, cash flow, competitive environment, salesforce performance, season, day of month, tax situation, currency values, etc.

Conventional approaches to specifying characteristics of promotions fail to provide a business with the ability to customize such promotions to customers based on relevant business data, such as inventory levels, financial operations, salesperson activity, customer behavior (such as prior purchases or product views), etc. Typically, a business is limited to static types of promotions that are based on a fixed percentage off, an amount off if an amount purchased exceeds a threshold, buy-one-get-one (BOGO) type offers, an offer of free shipping, etc. where such offers must be defined without reference to variable quantities. Further, conventional approaches do not provide systems and methods for implementing tenant-customizable promotion and incentive functions on a multi-tenant ERP/CRM platform, with such methods and systems being provided with access to relevant tenant accounts and data. Conventional approaches therefore do not permit tenant administrators to configure custom promotion capabilities for an eCommerce platform that may depend upon ERP/CRM or other business related data and thus are responsive to the current status of a business. Embodiments of the invention address this need both individually and collectively.

SUMMARY

The terms "invention," "the invention," "this invention" and "the present invention" as used herein are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the present system and methods for providing tenant configurable promotion capabilities to the tenants of a multi-tenant business data processing system or platform. This summary also introduces some of the concepts that are further described in the Detailed Description section below. This summary is not intended to identify key or essential features of the claimed subject matter, nor is it intended to be used to determine the scope of the claimed subject matter.

Embodiments of the invention are directed to a system and associated methods for enabling a tenant of a multi-tenant platform to customize the promotional functions of the tenant's eCommerce website which is hosted on the multi-tenant platform. Specifically, the embodiments described herein are directed to a system and associated methods for providing a tenant with the ability to configure one or more promotional or incentive offers to be presented to a consumer who is using the capabilities of the tenant's eCommerce platform or application (such as an eCommerce web-site and associated virtual storefront). The promotional offer(s) may be configured to suit the tenant's short term and/or long term business needs, such as to encourage purchase of a particular product or service at a particular time, to encourage a purchase in response to a particular business event or situation, to encourage a purchase in response to a particular action or lack of action by the consumer, to encourage a purchase in response to a particular inventory level or revenue amount of the tenant, to encourage a purchase in response to determining that the consumer was the object of a sales pitch from one of the tenant's salespeople, etc. In some embodiments, the promotional offer(s) may be configured in real-time or pseudo real-time by the tenant and may be presented to the consumer during the viewing and/or selection of a product or service, that is, prior to an actual purchase transaction. Further, determining whether a consumer is eligible for a certain promotional offer or incentive may also be determined in real-time or pseudo real-time and be based on one or more types of current business data of the tenant, such as ERP data, CRM data, financial data, etc. This permits a tenant to create a promotional campaign or offering that is dependent on factors that are separate from those of the eCommerce transaction that a customer is participating in, and instead reflect other business or operational aspects (or combinations of aspects) of the tenant.

In the case of a multi-tenant platform, each tenant of the multi-tenant platform may desire to implement its promotions functionality differently and with different business objectives in mind. For example, they may desire to base at least some of the criteria for offering a promotion on data that reflects the current status of their business and/or information in their records about other transactions involving a customer. Such data is available as part of the multi-tenant platform, and may include records related to other consumer purchases or activities, tenant current (or pseudo-current) inventory levels, tenant financial status, tenant projected financial status, tenant business goals for a relevant period of time, sales or marketing data, etc. Still further, a tenant may wish to make a particular promotional offer available to a consumer on a real-time or pseudo real-time basis, that is, as a consumer is viewing and/or selecting items and before a purchase transaction is completed. Such an offer may be based on one or more of what the consumer is presently intending to purchase, what the consumer has purchased in the past, the current financial situation of the tenant (revenues, profits, expected changes in the business environment, current business goals, etc.), demographic information for the customer, or other relevant information. To have a desired degree of flexibility in configuring and triggering promotional offers, a tenant may wish to be able to define an offer based on real-time or pseudo real-time business data or customer behaviors, where the offer may be defined in terms of dynamic variables whose values are determined for a specific customer during a transaction or other customer interaction with the tenant's eCommerce application.

Embodiments of the invention permit a tenant to specify, configure, and present to a consumer a promotional offer or offers that may depend on the consumer's present or previous behavior, as well as on the tenant's business related data (such as ERP, CRM, or eCommerce platform data). Embodiments of the invention enable a tenant of a multi-tenant platform to both define a promotional offer in terms of real-time or pseudo real-time values of specific business data, and also to determine a customer's eligibility for the offer based on real-time or pseudo real-time data related to the customer's behaviors. Conventionally, this flexibility is not available to merchants as their business data is not available on an integrated platform that also is used to operate their eCommerce platform. Further, in some embodiments, each tenant may be provided with a user interface for configuring that tenant's instantiation of a promotional offer function or process, where such a promotion or incentive may be configured in accordance with the tenant's business objectives and/or customer behavior.

In one embodiment, the invention is directed to a method of providing a promotional offer for a customer, where the method includes:

providing a user with a user interface configured to permit the user to define the promotional offer in terms of one or more of an item or items in a customer's shopping cart;

one or more sources of business related data used to determine eligibility for the offer, wherein the business related data is maintained by a multi-tenant platform;

a value or range of values that a type of data must have in order for the promotional offer to be valid or available; and one or more logical relations between data sources and data source values that must be present in order for the promotional offer to be valid or available;

determining the contents of the customer's shopping cart prior to the customer completing a payment transaction for the contents;

determining a value of the one or more sources of business related data used to determine eligibility for the offer;

determining if the customer is eligible for the promotional offer by evaluating the one or more logical relations between data sources and data source values that must be present in order for the promotional offer to be valid or available; and if the customer is eligible for the promotional offer, then applying the promotional offer to the contents of the customer's shopping cart.

In another embodiment, the invention is directed to a system for enabling a user to define a promotional offer for a customer, where the system includes:

one or more business related data processing applications installed in the system and accessible by a plurality of tenants of the system;

a data storage element accessible by the one or more business related data processing applications;

a processor programmed with a set of instructions, wherein when executed by the processor the instructions cause the system to provide the user with a user interface configured to permit the user to define the promotional offer in terms of one or more of
an item or items in a customer's shopping cart;
one or more sources of business related data used to determine eligibility for the offer, wherein the business related data is stored in the data storage element;
a value or range of values that a type of data must have in order for the promotional offer to be valid or available; and
one or more logical relations between data sources and data source values that must be present in order for the promotional offer to be valid or available;

determine the contents of the customer's shopping cart prior to the customer completing a payment transaction for the contents;

determine a value of the one or more sources of business related data used to determine eligibility for the offer;

determine if the customer is eligible for the promotional offer by evaluating the one or more logical relations between data sources and data source values that must be present in order for the promotional offer to be valid or available; and if the customer is eligible for the promotional offer, then applying the promotional offer to the contents of the customer's shopping cart.

In yet another embodiment, the invention is directed to a method for providing a tenant of a multi-tenant platform with a capability to generate a promotional offer for a customer, where the method includes:

providing a process to enable the tenant to define the promotional offer, wherein the definition may depend on one or more of ERP data, CRM data, eCommerce data, and customer profile data maintained on the platform; and providing a process to determine if a term or condition of the defined offer is satisfied by one or more of the customer, the customer's shopping cart, or the tenant's ERP, CRM or eCommerce data.

Other objects and advantages of the present invention will be apparent to one of ordinary skill in the art upon review of the detailed description of the present invention and the included figures.

BRIEF DESCRIPTION OF THE DRAWINGS

Various embodiments in accordance with the present disclosure will be described with reference to the drawings, in which.

DETAILED DESCRIPTION

Figure 1:
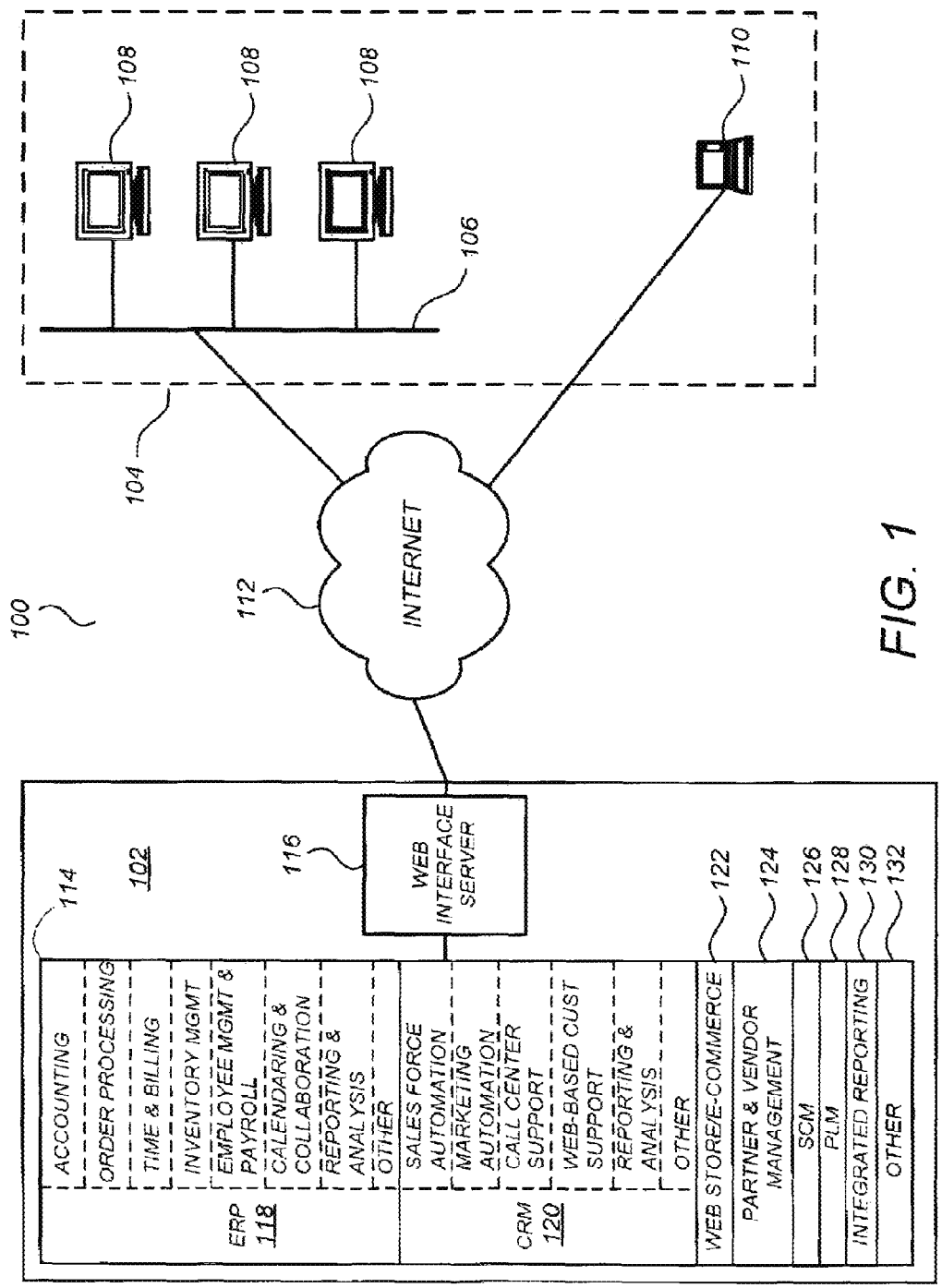
FIG. 1 is a diagram illustrating a system 100, including an integrated business system 102 and an enterprise network 104 in which an embodiment of the invention may be implemented.

This description discusses various illustrative embodiments of the inventive system and methods for providing configurable promotion and incentive offer functionality to the tenants of a multi-tenant platform. The promotion and incentive offer functionality may be configured by a tenant for use by a consumer accessing the tenant's eCommerce application, and may depend upon tenant business data such as ERP, CRM, financial, or other business data in addition to eCommerce related data. The description is provided with reference to the accompanying drawings in order to provide a person having ordinary skill in the relevant art with a full, clear, and concise description of the subject matter defined by the claims which follow, and to enable such a person to appreciate and understand how to make and use the same. However, this description should not be read to limit the scope of the claimed subject matter, nor does the presence of an embodiment in this description imply any preference of the described embodiment over any other embodiment, unless such a preference is explicitly identified herein. It is the claims, not this description or other sections of this document or the accompanying drawings, which define the scope of the subject matter to which the inventor and/or the inventor's assignee(s) claim exclusive entitlement.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or later developed technologies. This description should not be interpreted as implying any particular order or arrangement among or between various steps or elements except when the order of individual steps or arrangement of elements is explicitly described.

Among other embodiments, the invention may be embodied in whole or in part as a system, as one or more processes, operations, methods, or functions, or as one or more apparatuses or devices. Embodiments of the invention may take the form of an entirely hardware implemented embodiment, an entirely software implemented embodiment or an embodiment combining software and hardware aspects. For example, in some embodiments, one or more of the operations, functions, processes, or methods described herein may be implemented by a suitable processing element (such as a processor, microprocessor, CPU, controller, etc.) that is programmed with a set of executable instructions (e.g., software instructions), where the instructions may be stored in a suitable data storage element. The processor, microprocessor, CPU or controller may be a component or element of a computing device or data processing device or platform, such as a client device or a server used with an associated data storage element or database. In some embodiments, one or more of the operations, functions, processes, or methods described herein may be implemented by a specialized form of hardware, such as a programmable gate array, application specific integrated circuit (ASIC), or the like. The following detailed description is, therefore, not to be taken in a limiting sense.

In accordance with at least one embodiment of the invention, a multi-tenant business information system or multi-tenant distributed computing service platform is provided, where that system, service, or platform advantageously permits one or more tenants to customize the promotional offers and functionality provided by the platform for that tenant's eCommerce storefront or application. In one embodiment, the terms or conditions which define a promotional offer (such as a rebate, discount, benefit derived from a loyalty program, or other form of incentive to encourage a consumer to make a purchase) may depend upon business data maintained by the multi-tenant system, but that is not part of the tenant's eCommerce application. For example, a promotional offer may depend upon the tenant's business related ERP data (such as inventory levels, shipping costs, sales channel activities), CRM data (such as salesperson activities), or other data that characterizes the operation of the business. Further, determining whether a consumer accessing the tenant's eCommerce application is eligible to receive such a promotional offer may depend on the current or near-current state of the business, as reflected by its business related data.

For example, a merchant may wish to enable a consumer to receive a discount based on one or more of: (1) characteristics of their current purchase; (2) the amount or type of their cumulative purchases; (3) a current business goal of the merchant (such as reducing inventory of a particular item); (4) a certain current or near-current state or condition of the merchant's business or operations as reflected by business data (such as ERP, CRM, or financial data); (5) an aspect of the relationship between the consumer and the merchant (such as the length of their relationship, the activities which led to the purchase including number of sales contacts, response to marketing efforts, etc.), etc. Embodiments of the invention enable the definition and execution of promotional offers that are capable of representing a response to the dynamic status of a business as well as the behaviors of a customer.

FIG. 1 is a diagram illustrating a system 100, including an integrated business system 102 and an enterprise network 104 in which an embodiment of the invention may be implemented. Enterprise network 104 may be associated with a business enterprise, such as a merchant. Alternatively, and in accordance with the advantages of an application service provider (ASP) hosted integrated business system, the business enterprise may comprise fewer or no dedicated facilities or business network at all, provided that its end users have access to an internet browser and an internet connection. For simplicity and clarity of explanation, the enterprise network 104 is represented by an on-site local area network 106 to which a plurality of personal computers 108 are connected, each generally dedicated to a particular end user (although such dedication is not required), along with an exemplary remote user computer 110 that can be, for example, a laptop computer or tablet computer of a traveling employee having internet access through a hotel, coffee shop, a public Wi-Fi access point, or other internet access modality. The end users associated with computers 108 and 110 may also (or instead) possess an internet-enabled smartphone or other electronic device (such as a PDA) having wireless internet access or other synchronization capabilities. Users of the enterprise network 104 interface with the integrated business system 102 across the Internet 112 or another suitable communications network or networks.

Integrated business system 102, which may be hosted by a dedicated third party ASP, may include an integrated business server 114 and a web interface server 116, coupled as shown in FIG. 1. It is to be appreciated that either or both of the integrated business server 114 and the web interface server 116 may be implemented on one or more different hardware systems and components even though represented as singular units in FIG. 1. Integrated business server 114 comprises an ERP module 118 and further comprises a CRM module 120. In many cases, it will be desirable for the ERP module 118 to share methods, libraries, databases, subroutines, variables, etc., with CRM module 120, and indeed ERP module 118 may be intertwined with CRM module 120 into an integrated Business Data Processing Platform (which may be single tenant, but is typically multi-tenant).

The ERP module 118 may include, but is not limited to, a finance and accounting module, an order processing module, a time and billing module, an inventory management and distribution module, an employee management and payroll module, a calendaring and collaboration module, a reporting and analysis module, and other ERP-related modules. The CRM module 120 may include, but is not limited to, a sales force automation (SFA) module, a marketing automation module, a contact list module (not shown), a call center support module, a web-based customer support module, a reporting and analysis module, and other CRM-related modules. The integrated business server 114 (or multi-tenant data processing platform) further may provide other business functionalities including a web store/eCommerce module 122, a partner and vendor management module 124, and an integrated reporting module 130. An SCM (supply chain management) module 126 and PLM (product lifecycle management) module 130 may also be provided. Web interface server 116 is configured and adapted to interface with the integrated business server 114 to provide one or more web-based user interfaces to end users of the enterprise network 104.

The integrated business system shown in FIG. 1 may be hosted on a distributed computing system made up of at least one, but likely multiple, "servers." A server is a physical computer dedicated to run one or more software services intended to serve the needs of the users of other computers in data communication with the server, for instance via a public network such as the Internet or a private "intranet" network. The server, and the services it provides, may be referred to as the "host" and the remote computers, and the software applications running on the remote computers, being served as "clients." Depending on the computing service that a server offers it could be referred to as a database server, file server, mail server, print server, web server, etc. A web server is a most often a combination of hardware and the software that helps deliver content, commonly by hosting a website, to client web browsers that access the web server via the Internet.

Figure 2A:
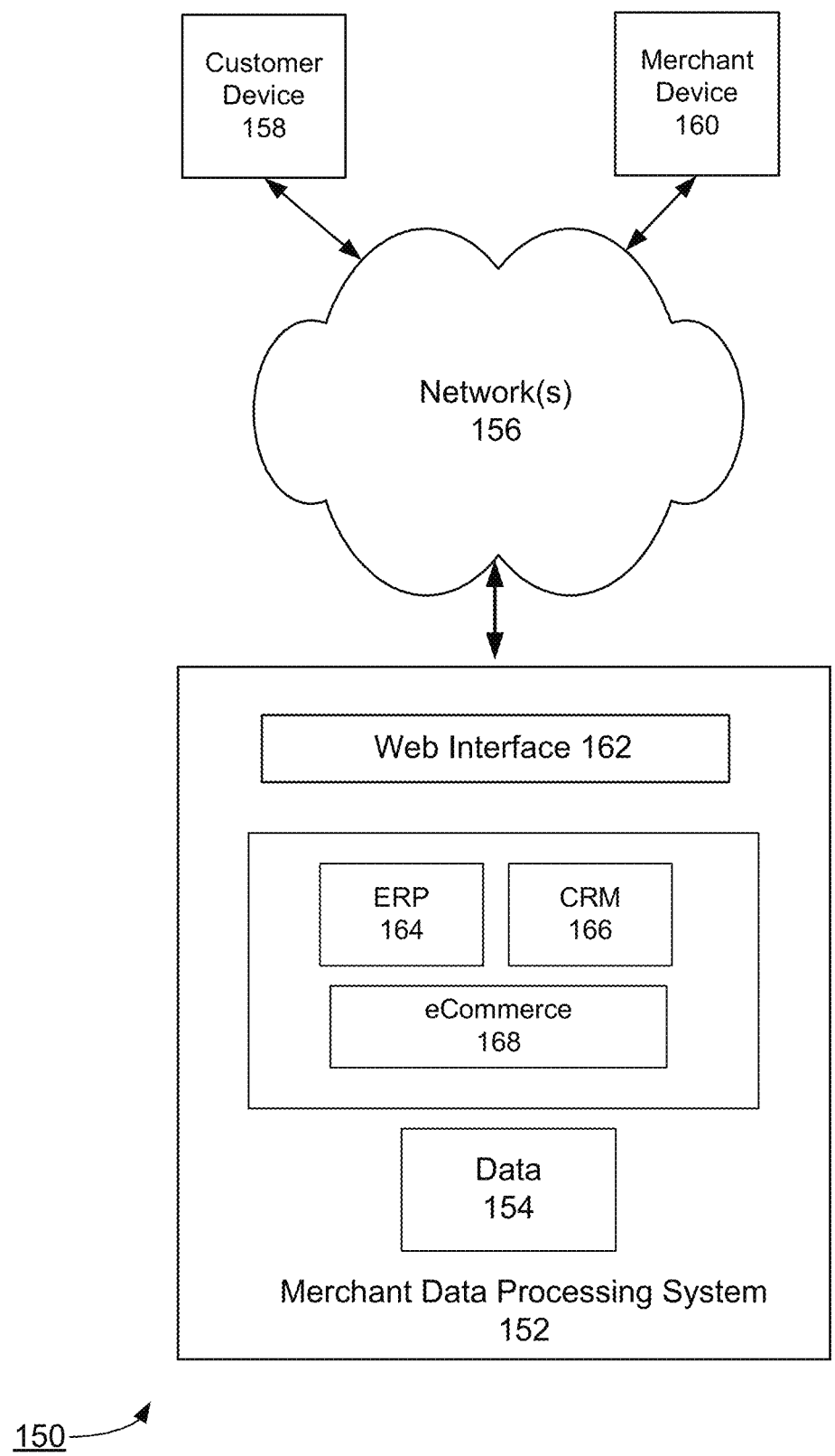
FIG. 2(a) is a diagram illustrating another perspective of a computing or data processing environment 150 in which an embodiment of the invention may be implemented.

FIG. 2(a) is a diagram illustrating another perspective of a computing or data processing environment 150 in which an embodiment of the invention may be implemented. The figure illustrates a Merchant's data processing system 152, where such a platform or system may be provided to and operated for the Merchant by the administrator of a multi-tenant business data processing platform. Thus, the Merchant may be a tenant of such a multi-tenant platform, with the elements that are part of system 152 being representative of the elements in the data processing systems available to other tenants. The Merchant's (or tenant's) data is stored in a data store 154, thereby permitting customers and employees to have access to business data and information via a suitable communication network or networks 156 (e.g., the Internet). Data store 154 may be a secure partition of a larger data store that is shared by other tenants of the overall platform.

A user of the Merchant's system 152 may access data, information, and applications (i.e., business related functionality) using a suitable device or apparatus, examples of which include a customer computing device 158 and/or the Merchant's computing device 160. In one embodiment, each such device 158 and 160 may include a client application such as a browser that enables a user of the device to generate requests for information or services that are provided by system 152. System 152 may include a web interface 162 that receives requests from users and enables a user to interact with one or more types of data and applications (such as ERP 164, CRM 166, eCommerce 168, or other applications that provide services and functionality to customers or business employees).

Figure 2B:
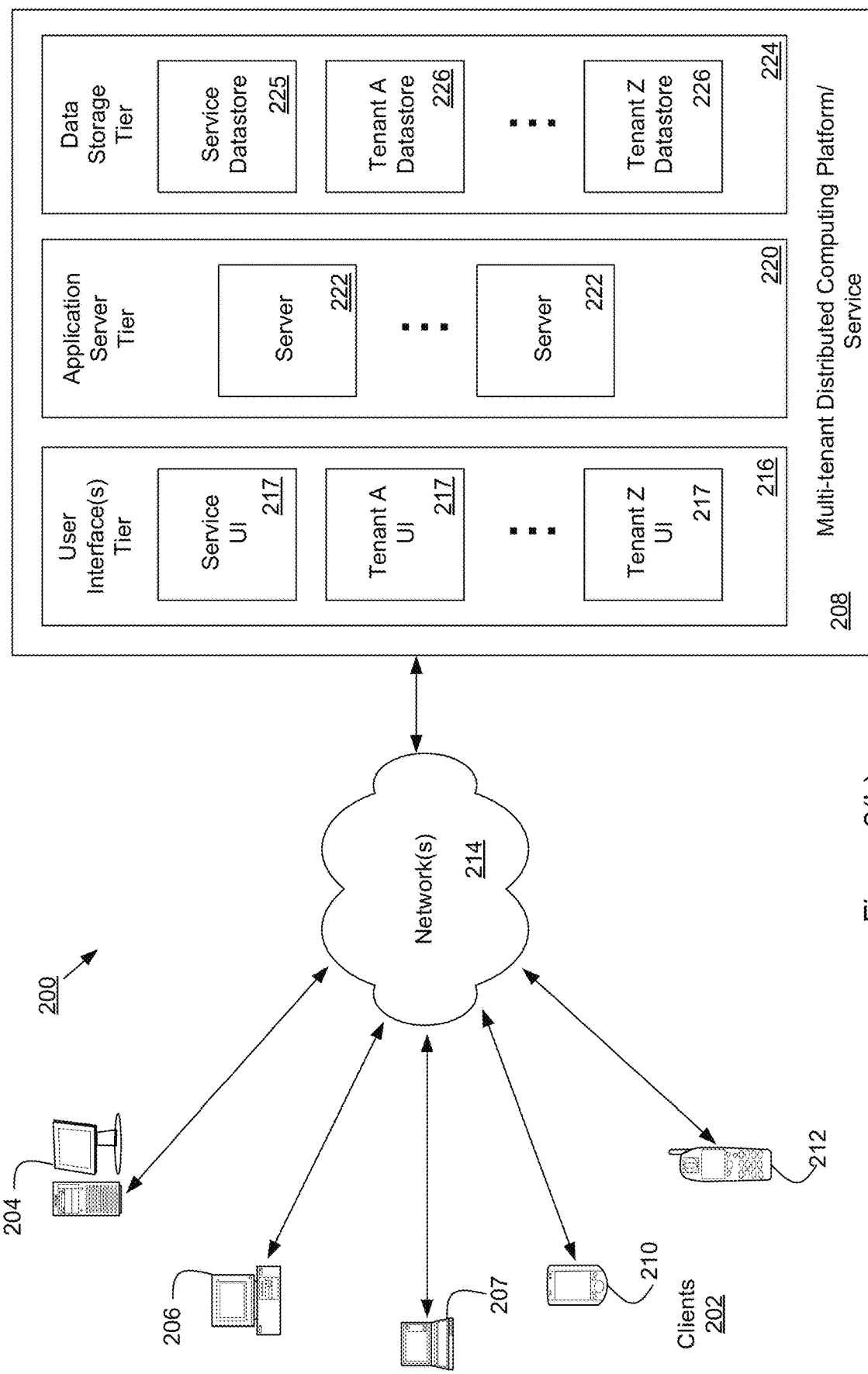
FIG. 2(b) is a diagram illustrating another example of a computing environment 200 in which an embodiment of the invention may be implemented.

FIG. 2(b) is a diagram illustrating another example of a computing environment 200 in which an embodiment of the invention may be implemented. Although similar in some respects to that shown in FIG. 1 and FIG. 2(a), FIG. 2(b) illustrates another way of viewing a multi-tenant distributed computing service platform of the type in which an embodiment of the invention may be implemented. As shown, a variety of clients 202 incorporating and/or incorporated into a variety of computing devices may communicate with a distributed computing platform/service 208 through one or more networks 214. For example, a client may incorporate and/or be incorporated into a client application (e.g., software) implemented at least in part by one or more of the computing devices. Examples of suitable computing devices include personal computers, server computers 204, desktop computers 206, laptop computers 207, notebook computers, tablet computers, personal digital assistants (PDAs) 210, smart phones 212, cell phones, and consumer electronic devices incorporating one or more computing device components, such as one or more electronic processors, microprocessors, central processing units (CPU), or controllers. Examples of suitable networks 214 include networks utilizing wired and wireless communication technologies and networks operating in accordance with any suitable networking and/or communication protocol (e.g., the Internet).

The distributed computing platform/service 208 may include multiple processing tiers including a user interface tier 216, an application server tier 220, and a data storage tier 224. The user interface tier 216 may maintain multiple user interfaces 217, including graphical user interfaces and/or web-based interfaces. The user interfaces may include a default user interface for the service (depicted as "Service UI"), as well as one or more user interfaces extended by one or more tenants of the service (e.g., via access to one or more APIs). The default user interface may include components enabling a tenant to implement service platform modifications, such as to configure, define and activate one or more promotional or incentive offers for a consumer accessing the tenant's eCommerce application, and to otherwise administer the tenant's participation in the functions and capabilities provided by the service platform. Each processing tier shown in the figure may be implemented with a set of computers and/or computer components including computer servers and processors, and may perform various functions, methods, processes, or operations as determined by the execution of a software application or set of instructions. The data storage tier 224 may include one or more data stores, which may include a Service Data store 225 and one or more tenant Data stores 226. Data stores may be implemented with any suitable data storage technology, including structured query language (SQL) based relational database management systems (RDBMS).

In accordance with at least one embodiment of the invention, distributed computing platform/service 208 may be multi-tenant, and one or more tenants may be able to implement a promotion function or capability to the eCommerce or other services and functions provided for that tenant by platform/service 208. Before providing additional details regarding that implementation, further information is provided with respect to distributed computing services and service platform operations, in accordance with at least one embodiment of the invention.

As noted, platform/service 208 may be operated by an entity in order to provide multiple tenants with a set of business related applications and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information.

As also noted, such business information systems may include an Enterprise Resource Planning (ERP) system that integrates the capabilities of several historically separate business computing systems into a common system, with the intention of streamlining business processes and increasing efficiencies on a business-wide level. By way of example, the capabilities or modules of an ERP system may include: accounting, order processing, time and billing, inventory management, employee management/payroll, and employee calendaring and collaboration, as well as reporting and analysis capabilities relating to these functions. Another business information system that may be provided as part of a service platform is an integrated Customer Relationship Management (CRM) system, which is designed to assist in obtaining a better understanding of customers, enhance service to existing customers, and assist in acquiring new and profitable customers. By way of example, the capabilities or modules of a CRM system may include: sales force automation (SFA), marketing automation, contact list management, call center support, and web-based customer support, as well as reporting and analysis capabilities relating to these functions. In addition to ERP and CRM functions, a business information system (such as element 208 of FIG. 2) may also include one or more of an integrated partner and vendor management system, eCommerce system (e.g., a virtual storefront application or platform), product lifecycle management (PLM) system, or supply chain management (SCM) system.

Note that both functional advantages and strategic advantages may be gained through the use of an integrated business system comprising ERP, CRM, and other business capabilities, as for example where the integrated business system is integrated with a merchant's eCommerce platform and/or "web-store." For example, a customer searching for a particular product can be directed to a merchant's website and presented with a wide array of product and/or services from the comfort of their home computer, or even from their mobile phone. When a customer initiates an online sales transaction via a browser-based interface, the integrated business system can process the order, update accounts receivable, update inventory databases and other ERP-based systems, and can also automatically update strategic customer information databases and other CRM-based systems. These modules and other applications and functionalities may advantageously be integrated and executed by a single code base accessing one or more integrated databases as necessary, forming an integrated business management system or platform.

However, each merchant is unique in terms of their commercial offerings, desired customer demographics, and marketing techniques, and also in terms of their internal business organization and philosophies. Therefore, a robust integrated business services platform preferably offers not only a rich set of features, but also is capable of being customized for each business' needs. Thus, it is desirable to provide users of such a system with the ability to develop custom services and capabilities that leverage the advantages of the functionality of an integrated business platform in the manner most desired by a particular tenant or user.

Embodiments of the invention permit a tenant to specify, configure, and present to a consumer a promotional offer or offers that may depend on the consumer's present or previous behavior, as well as on the tenant's business related data (such as ERP, CRM, or eCommerce platform data). Embodiments of the invention enable a tenant of a multi-tenant platform to both define a promotional offer in terms of real-time or pseudo real-time values of specific business data, and also to determine a customer's eligibility for the offer based on real-time or pseudo real-time data related to the customer's current or previous behaviors. Further, in some embodiments, each tenant may be provided with a user interface for configuring that tenant's instantiation of a promotional offer function or process, where such a promotion or incentive may be configured in accordance with the tenant's business objectives and/or customer behavior.

Figure 3:
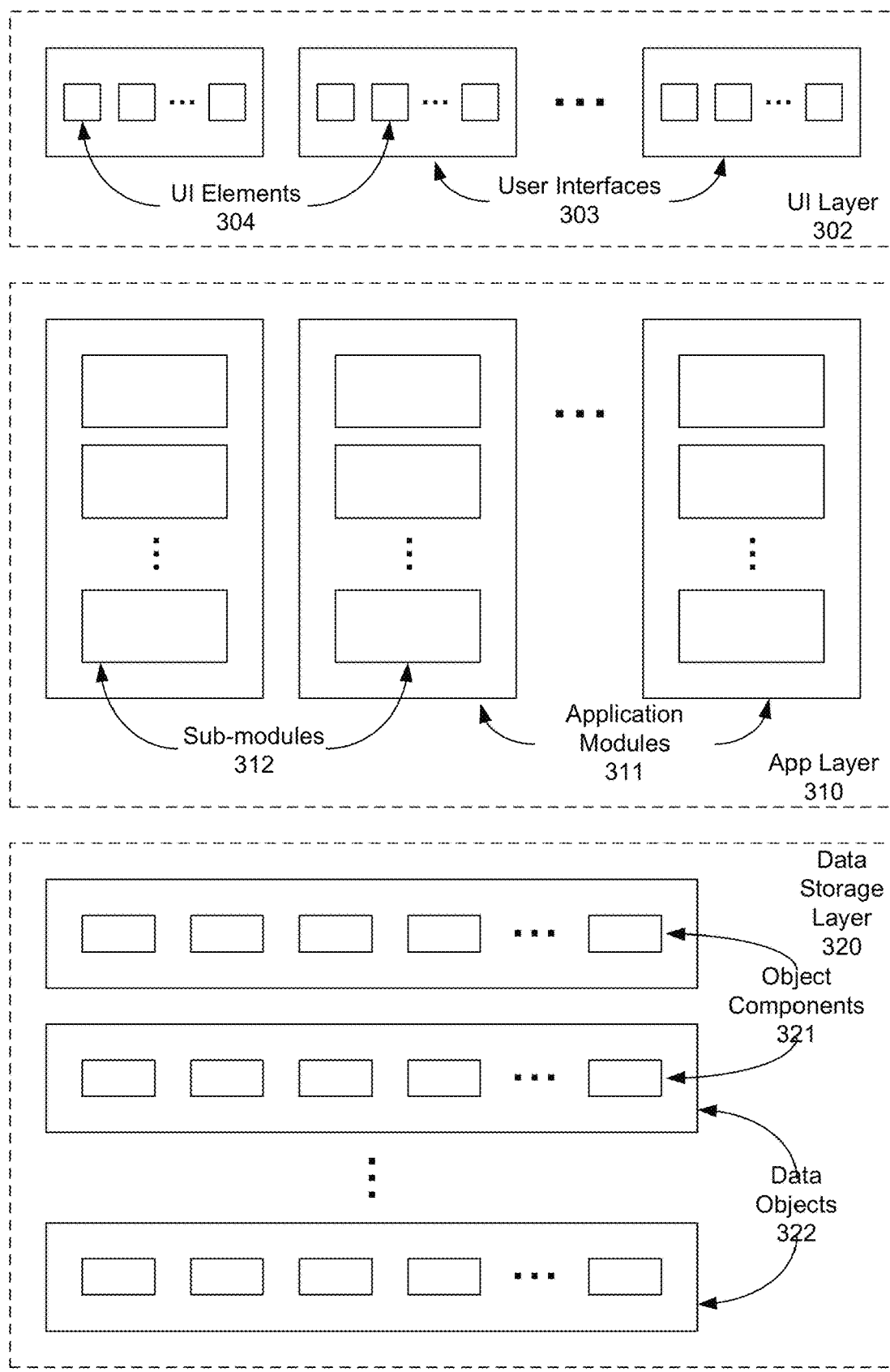
FIG. 3 illustrates elements of an example of a distributed computing service architecture 300 that may be used to implement an embodiment of the invention.

FIG. 3 illustrates elements of an example of a distributed computing service architecture 300 that may be used to implement an embodiment of the invention. The example architecture includes a user interface layer or tier 302 having one or more user interfaces 303. Examples of such user interfaces include graphical user interfaces and application programming interfaces (APIs). Each user interface may include one or more interface elements 304. For example, users may interact with interface elements in order to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks and dialog boxes. Application programming interfaces may be local or remote, and may include interface elements such as parameterized procedure calls, programmatic objects and messaging protocols.

User Interfaces 303 and UI Elements 304 may include one or more components or elements configured to enable a tenant to define and create a promotional offer, where the criteria for the offer may be specified in terms of the tenant's business related data that is available through the multi-tenant platform. Such a User Interface may include User Interface Elements that permit configuration of the promotional offer in terms of data sources (e.g., ERP, CRM, eCommerce), data values, and logical functions (e.g., Boolean logic, conditions, rules, etc.).

The application layer 310 may include one or more application modules 311, each having one or more sub-modules 312. Each application module 311 or sub-module 312 may correspond to a particular function, method, process, or operation that is implemented by the module or sub-module. Such function, method, process, or operation may include those used to implement one or more aspects of the inventive system and methods, such as one or more eCommerce platform functions, enabling definition/configuration of a promotional offer, determining if the terms or conditions of the offer are satisfied, presenting a satisfied offer to a consumer, accessing ERP, CRM, eCommerce, or other data to determine if the offer is satisfied, etc.

For example, in some embodiments, application module 311 or sub-module 312 may include software code that when executed by a properly programmed processing element enables the inventive system to:

Present a user interface to a tenant user of the multi-tenant platform to enable the user to specify the terms or conditions of a promotional offer, where such an offer may depend on one or more of
The contents of a customer's "shopping cart";
One or more sources of data used to determine eligibility for the offer (e.g., CRM, ERP, financial, other);
A value or range of values that a type of data must have in order for the promotional offer to be valid or available; and
One or more logical relations between data sources and data source values that must be present in order for the promotional offer to be valid or available;
Determine the contents of a customer's shopping cart in real-time or pseudo real-time (note that this determination may be enabled to occur prior to checkout or authorization of a purchase transaction);
Access one or more data sources defined or specified in the terms or conditions of one or more potential promotional offers (e.g., ERP, CRM, financial, eCommerce, etc.);
Compare the real-time or pseudo real-time value or values of one or more of the data sources defined or specified in the terms or conditions of one or more potential promotional offers to determine if the rules or conditions of an offer is satisfied (note that this may include both customer specific data and business related data);
Based on the comparison(s), determine if a customer is eligible to receive one or more promotional offers; and
If the customer is (or may be) eligible to receive one or more promotional offers, then notify the customer and/or the eCommerce platform transaction processing elements.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 222 of FIG. 2) may include each application module. Alternatively, different application servers may include different sets of application modules. Such sets may be disjoint or overlapping.

The data storage layer 320 may include one or more data objects 322 each having one or more data object components 321, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 1-3 are not intended to be limiting examples. Alternatively, or in addition, computing environments in which an embodiment of the invention may be implemented include any suitable system that permits consumers to access and utilize an eCommerce platform or application and its related functions, operations, methods, or processes (typically as part of an integrated platform offering ERP, CRM, and other functional capabilities). Although further examples below may reference the example computing environment depicted in FIGS. 1-3, it will be apparent to one of skill in the art that the examples may be adapted for alternate computing devices, systems, and environments.

Figure 4:
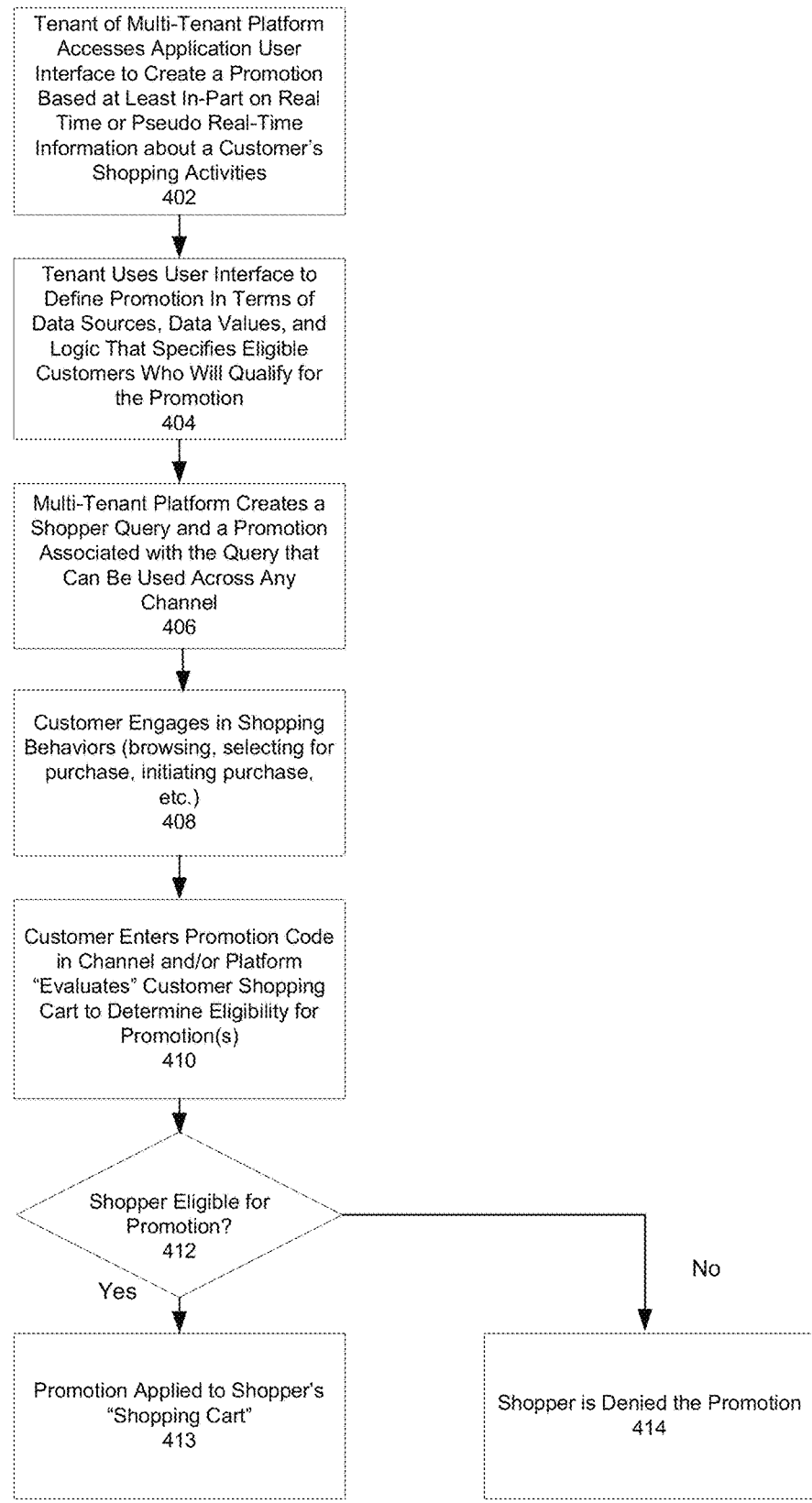
FIG. 4 is a flowchart or flow diagram illustrating an example process, method, function or operation for defining or configuring a promotional offer and determining if the terms of the offer are satisfied, in accordance with an embodiment of the invention.

FIG. 4 is a flowchart illustrating an example process or method 400 for defining or configuring a promotional offer and determining if the terms of the offer are satisfied, in accordance with an embodiment of the invention. Note that FIG. 4 illustrates an exemplary process for performing certain functions or operations and that embodiments of the invention are not limited to the steps or order of steps shown in the figure, and may include other, additional, or fewer steps.

FIG. 4 illustrates a process wherein a tenant of a multi-tenant platform desires to define and configure a promotional offer that depends at least in part on data regarding a customer's shopping activities. Note that this process may be used in combination with the process illustrated in FIG. 5 so that a promotional offer is defined in terms of both customer specific and business specific data.

As shown in the figure, in one embodiment a tenant of a multi-tenant platform accesses a suitable User Interface to enable them to create/define/configure a promotional offer based at least in-part on real-time or pseudo real-time information about a Customer's shopping activities (step or stage 402). The promotional offer may be a discount on a current or future purchase, a buy-one-get-one type of offer, an incentive to try a new product, a reduction in shipping cost, a more favorable return policy, etc. At step or stage 404, the tenant/user uses the interface to define the desired promotion in terms of data sources, data source values or range of values, and applicable logic.

The data sources may include (but are not limited to) one or more of data regarding a customer's current shopping activities (items browsed, selected, placed into shopping cart, etc.), data regarding the customer and/or their previous shopping activities (amount spent, frequency of purchases, date of last purchase, types of items typically purchased or not purchased, etc.), an item recommended for the customer based on their current or previous shopping activities and generated by a suitable decision process (such as collaborative filtering, a machine learning model, etc.), a customer relationship with the tenant or tenant's employees (such as being the object of a salesperson's visit or proposal as determined from CRM data), etc. The data source value or values that need to be present in order to cause the promotional offer to be available may be expressed as one or more of a single value, a threshold value, a range of values, or other suitable expression. The applicable logic may be expressed as one or more rules (e.g., "If parameter A has a value of x AND parameter B is less than y, then make offer"), as one or more conditions that must be satisfied, as one or more relationships that must be satisfied, etc. and may be expressed in terms of any suitable logic or expressions (e.g., Boolean operators, statistical functions, distributions, cumulative values, etc.). Next, the platform creates data corresponding to a "Shopper Query" and an associated promotional offer (step or stage 406). Note that in some embodiments, this query and associated offer may be available within any suitable shopping or customer service channel, including an eCommerce platform or application, a mobile shopping application, an in-store kiosk, a point of sale terminal, a customer service platform, or other point of contact between the customer and the business.

Sometime later (or in some cases during the definition of the promotional offer, where, as noted the offer may depend to some extent on the current contents of the customer's shopping cart), the customer engages in shopping related behaviors. These may include, for example, browsing products using an on-line website, selecting an item to place it in the customer's shopping cart, initiating a purchase transaction, submitting a query using a shopping application, contacting a customer service representative or other employee to request information about a product, etc. (step or stage 408). The platform/system may evaluate the contents of the customer's shopping cart and/or the customer's shopping behaviors periodically, after the occurrence of a predetermined event (such as placement of item in cart, browsing description of item, initiation of purchase transaction, etc.). Based on the contents of the cart and/or the behaviors, the system may determine that the customer is eligible or likely to be eligible for a particular promotional offer (step or stage 410). In response, the platform/system may provide a promotion code (typically alphanumeric, but may take any suitable form) to the customer. In cases where a code may have been provided to the customer previously (during the same or an earlier use of the platform/system), the customer may be asked if they wish to enter a promotion code.

Note that the platform/system may use one or more of the customer's shopping behaviors, the contents of the customer's shopping cart, or customer-specific data (such as demographic, spending, previous contacts with a business, etc.) in determining whether a customer is or may be eligible to receive a promotional offer. This is typically done by comparing information about the customer, the customer's behaviors, and the contents of the shopping cart to one or more defined promotional offers to determine if the information satisfies the rules or conditions of the offer(s) based on the data sources, data values or range of values, and logic specified in the definition of the offer(s).

After the customer enters a promotion code and/or the platform evaluates the customer's shopping cart to determine that the customer may be eligible for one or more promotion(s), the invention confirms whether the customer is in fact eligible (step or stage 412). If the customer is eligible for a specific promotion, then that offer is applied to the content of the customer's shopping cart (step or stage 413, i.e., the purchase transaction based on the contents), as illustrated by the "Yes" branch of step or stage 412. However, if the customer is not eligible for a specific promotion, then that offer not applied to the content of the customer's shopping cart (step or stage 414), as illustrated by the "No" branch of step or stage 412.

Figure 5:
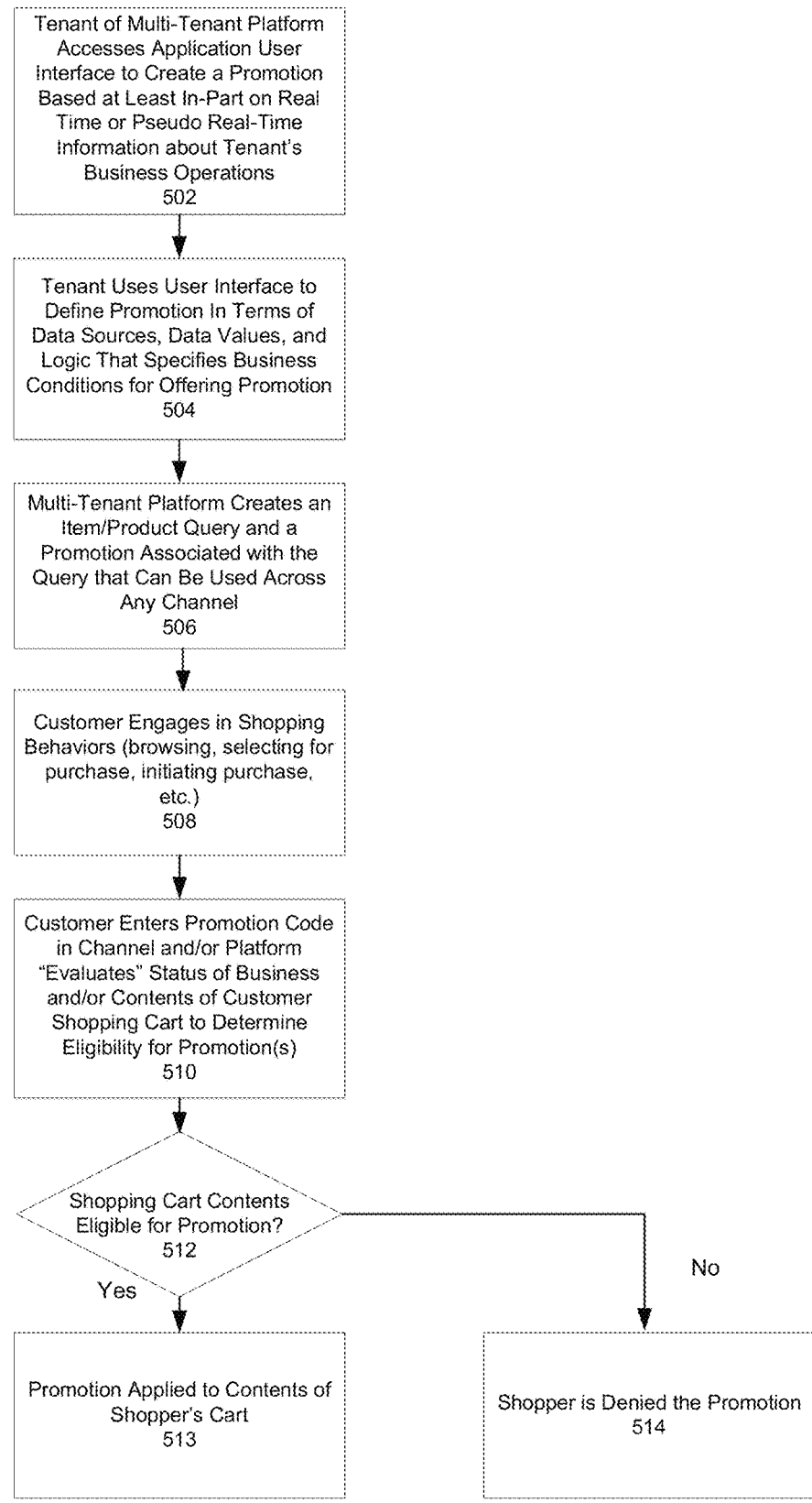
FIG. 5 is a flowchart or flow diagram illustrating another example process, method, function or operation for defining or configuring a promotional offer and determining if the terms of the offer are satisfied, in accordance with an embodiment of the invention.

FIG. 5 is a flowchart illustrating another example process or method 500 for defining or configuring a promotional offer and determining if the terms of the offer are satisfied, in accordance with an embodiment of the invention. Note that FIG. 5 illustrates an exemplary process for performing certain functions or operations and that embodiments of the invention are not limited to the steps or order of steps shown in the figure, and may include other, additional, or fewer steps.

FIG. 5 illustrates a process wherein a tenant of a multi-tenant platform desires to define and configure a promotional offer that depends at least in part on data regarding a business' status or condition. Note that this process may be used in combination with the process illustrated in FIG. 4 so that a promotional offer is defined in terms of both customer specific and business specific data.

As shown in the figure, in one embodiment a tenant of a multi-tenant platform accesses a suitable User Interface to enable them to create/define/configure a promotional offer based at least in-part on real-time or pseudo real-time information about the tenant's business operations (step or stage 502). The promotional offer may be a discount on a current or future purchase, a buy-one-get-one type of offer, an incentive to try a new product, a reduction in shipping cost, a more favorable return policy, etc. At step or stage 504, the tenant/user uses the interface to define the desired promotion in terms of data sources, data source values or range of values, and applicable logic.

The data sources may include (but are not limited to) one or more of data regarding the status of the business' operations as expressed by ERP data (inventory, revenue, profits, etc.), CRM data (salesperson performance, compensation, sales leads, customer interactions with sales people, etc.), financial data, eCommerce platform data (purchase transactions, customer views, etc.) or another source of relevant data. The data source value or values that need to be present in order to cause the promotional offer to be available may be expressed as one or more of a single value, a threshold value, a range of values, or other suitable expression. The applicable logic may be expressed as one or more rules (e.g., "If parameter A has a value of x AND parameter B is less than y, then make offer"), as one or more conditions that must be satisfied, as one or more relationships that must be satisfied, etc. and may be expressed in terms of any suitable logic or expressions (e.g., Boolean operators, statistical functions, distributions, cumulative values, etc.). Next, the platform creates data corresponding to an "Item/Product Query" and an associated promotional offer (step or stage 506). Note that in some embodiments, this query and associated offer may be available within any suitable shopping or customer service channel, including an eCommerce platform or application, a mobile shopping application, an in-store kiosk, a point of sale terminal, a customer service platform, or other point of contact between the customer and the business.

Sometime later (or in some cases during the definition of the promotional offer, where, as noted the offer may depend to some extent on the current status of the business' operations), the customer engages in shopping related behaviors. These may include, for example, browsing products using an on-line website, selecting an item to place it in the customer's shopping cart, initiating a purchase transaction, submitting a query using a shopping application, contacting a customer service representative or other employee to request information about a product, etc. (step or stage 508). The platform/system may evaluate the status of the business and/or the contents of the customer's shopping cart (and/or the customer's shopping behaviors) periodically, after the occurrence of a predetermined event (such as placement of item in cart, browsing description of item, initiation of purchase transaction, etc.). Based one or more of the status of the business (as reflected by the various sources of data), the contents of the cart, or the customer's shopping behaviors, the system may determine that the customer is eligible or likely to be eligible for a particular promotional offer (step or stage 510). In response, the platform/system may provide a promotion code (typically alphanumeric, but may take any suitable form) to the customer. In cases where a code may have been provided to the customer previously (during the same or an earlier use of the platform/system), the customer may be asked if they wish to enter a promotion code.

Note that the platform/system may use one or more of data regarding the status of the business (ERP, CRM, eCommerce, financials, etc.), the customer's shopping behaviors, the contents of the customer's shopping cart, or customer-specific data (such as demographic, spending, profile, previous contacts with a business, etc.) in determining whether a customer is or may be eligible to receive a promotional offer. This is typically done by comparing information about the status of the business, the customer, the customer's behaviors, and the contents of the shopping cart to one or more defined promotional offers to determine if the information satisfies the rules or conditions of the offer(s) based on the data sources, data values or range of values, and logic specified in the definition of the offer(s).

After the customer enters a promotion code and/or the platform evaluates the customer's shopping cart to determine that the customer may be eligible for one or more promotion(s), the invention confirms whether the customer is in fact eligible (step or stage 512). If the customer is eligible for a specific promotion, then that offer is applied to the content of the customer's shopping cart (step or stage 513, i.e., the purchase transaction based on the contents), as illustrated by the "Yes" branch of step or stage 512. However, if the customer is not eligible for a specific promotion, then that offer not applied to the content of the customer's shopping cart (step or stage 514), as illustrated by the "No" branch of step or stage 512.

In addition to being able to condition eligibility of a promotional offer on business specific and/or customer specific information, embodiments of the invention also permit a promotion to be offered based on actual, anticipated, or incentivized behavior of a customer. For example, business specific data may cause a business to want to motivate customers to make certain types of purchases, and hence to define a promotional offer based on inventory levels, season, etc. However, the offer may be made available both to customers whose shopping cart contains the item or items defined by the terms of the offer and also to customers who may be incentivized to make additional purchases in order to qualify for the offer. Thus, in some embodiments an offer can be suggested to a customer prior to initiation of a checkout process and be based on partial satisfaction of the terms or conditions of an offer (and perhaps based on evaluation of customer related data that suggests that the customer would be inclined to make an additional purchase in order to obtain the benefit of the offer, such as prior purchase history, demographics, etc.).

As noted, in one embodiment, the invention includes elements or components that enable a user to define or configure a promotional offer or other form of incentive in terms of factors or conditions that depend on data maintained for a merchant on the multi-tenant platform. Such data may include ERP or CRM data, in addition to eCommerce platform related data. As an example, a merchant using the invention may have the benefit of having one or more of the following types of data available and accessible for both (a) defining the terms of an offer and for (b) determining if the offer terms and conditions are satisfied (which may be done in real-time or pseudo real-time):

ERP data types:
  Products
  Inventory Levels, Costs/Pricing
  Annual sales (YTD, monthly, last year at same time)
  Quotas (for each sales rep, for a department)
  Sales Forecasts (for each sales rep, for a department)—note that a sales rep may be responsible for a geographical territory or represent such a territory.
  Other ERP related data used to operate a business (which may be specific to the type or nature of the business).
Financial Data:
  Cash flow, expected revenue, profits, profit margins, tax obligations, currency values, debt, etc. (current, projected, compared to previous period, etc.)
CRM data types:
  Customer profiles (name, address)
  Customer purchase history, behaviors and trends
  Overall customer or client Value based on historical revenue, returned products
  Other CRM related data used to operate business (which may be specific to the type or nature of the business)
ERP+CRM (e.g., data obtained from multiple data sources which can yield synergistic benefits)
  Customer receivables (overdue payments, late, missed, trends in use of credit, returns, etc.)
eCommerce Platform/Application data types:
  Customer browsing behavior, browse time, item search queries
  Customer placement in "shopping cart"
  Customer initiation of checkout process
  Customer updating of profile data
  Other eCommerce related data used to operate platform (which may be specific to the type or nature of the business)

Note that a merchant that is not using a multi-tenant platform may have a legacy system to track the ERP information, but are unlikely to have the CRM data available or integrated with the ERP data, because it will be stored outside the legacy system. Further, such a merchant would lack access to the benefits obtained from integrating the ERP data with the CRM data, and as well as the synergistic benefits from the combined ERP+CRM information and other combinations of data available to users of such platforms.

In contrast, in some embodiments of the invention, a user can execute a complex SQL query (a "Saved Search") to access any or all of this available information and thereby define a more flexible and useful promotion. In addition, these multiple sources of integrated data may be used to determine when a consumer is eligible for an offer or promotion, or even to suggest the terms of an offer or promotion to a consumer who is in the process of shopping (based on what may be in a shopping cart but not yet purchased, or based on what has been viewed but not yet placed into a shopping cart, etc.).

Embodiments of the invention provide the ability to define and create a dynamically configurable promotion, and permit the defined promotion to be evaluated or "tested" against current inventory levels, sales or projected sales, customer relations data, current or projected financial data, or other aspects of a business in real-time or pseudo real-time. As an example, a promotion or offer that may be defined in accordance with an embodiment of the invention may be based on the following process and data sources:

1. A list of items, each with a set of attributes of different data types (numeric, string, date, etc.);
2. An ad hoc report (a "saved search" or offer definition) that selects a subset of the items; and
3. A process that applies a promotion defined by a rule or fixed amount (e.g., a discount) to one or more items (which can be programmatically defined via a custom coded plugin, for example). Note that the rule or other factors used to define the conditions for applying the promotion may depend on real-time or pseudo real-time data, such as inventory, sales, product availability, consumer behavior, ERP, CRM, etc.

Example Data:
  ERP based data: Product Name and/or ID, Inventory Level, Price/Cost
    Name: jacket; price: $50; cost: $30; inventory: 100
    Name: shirt; price: $25; cost $10; inventory: 5
    Name: pants; price $40; cost $15; inventory: 250.
  Examples of Possible SQL Queries (Definition of Offer Terms):
    Select all items that have inventory above 100
    Select all items that have over 50% profit margin;
    Select all items that have inventory above 100 AND
      Select all items that have over 50% profit margin;
    Select all items that have inventory above 100 AND
      Select all items that have over 50% profit margin AND
      Select all the customers that have CustomerValue greater than 75.
  Examples of Conditions/Terms of Promotion or Offer to Customer or Client:
    Apply 10% discount to items that match the results of the report (the items identified as eligible for a promotion);
    Buy one get one (BOGO) free for any 2 items that match results of the report;
    Add a related accessory to the cart for free; or
    Add an in-store credit of $10.

As noted, among other advantages, embodiments of the invention include the following aspects and benefits:

(1) Dynamic definition of a promotion—based on real time or pseudo real-time updates to the Item information (price, cost, inventory, store availability, etc.), Customer information (available credit, purchase history, shopping behavior, etc.), or other business related data (revenue, revenue per store, profits, cash flow projections, etc.).

For example, a merchant can define a promotion that qualifies a shopper for a promotion after they spend $100 a month with them; as soon as the shopper buys $100 worth of items from the merchant's retail location, call center, web-store, or a combination of those sources, the consumer would automatically qualify for a promotion. The promotion can be based on a scheduled script so a consumer gets notified that they have access to a new promo code they can use while they shop via any channel. In this case, the dynamic nature of the promotion is supported by having the multiple sources of data integrated across all of a merchant's commerce channels; and (2) Dynamic application of the defined promotion—because the invention can determine in real-time that a customer qualifies for a promotion and the invention can apply the terms of the promotion and present that information to a consumer as soon as they qualify (such as when they are still interacting with a merchant's eCommerce platform), the customer receives real-time or pseudo real-time incentives and this reinforces a customer's positive impression of a business and may incentivize the customer to increase their purchases.

The following is another example of the steps or stages that may be implemented in an embodiment of the invention:

Merchant creates a promotion;
  a. Merchant decides the type of promotion and the terms of the promotion (e.g., 10% off or $50 off);
  b. Merchant defines the dynamic cart criteria—i.e., the type of items that should be in the cart or the amount of cart content; and
  c. Merchant defines the dynamic criteria—i.e., the type of shopper that is eligible for the promotion;

Merchant communicates a promotion code to a customer shopper (e.g., via email campaign, in store coupon, or publishing it on the website as a banner, etc);

Shopper enters the coupon code at shopping cart checkout;

When the coupon code is entered, the promotion engine runs the Merchant's promotion terms (as defined by step (c) above) to verify that the shopper is eligible for the promotion;

If the shopper is eligible, then the promotion engine runs the item saved search (as defined by step (b) above) to verify if the contents of the cart or the cart itself qualifies for the promotional offer; and If the cart contents are eligible, then the promotion/discount is applied to the contents of the cart.

Figure 6:
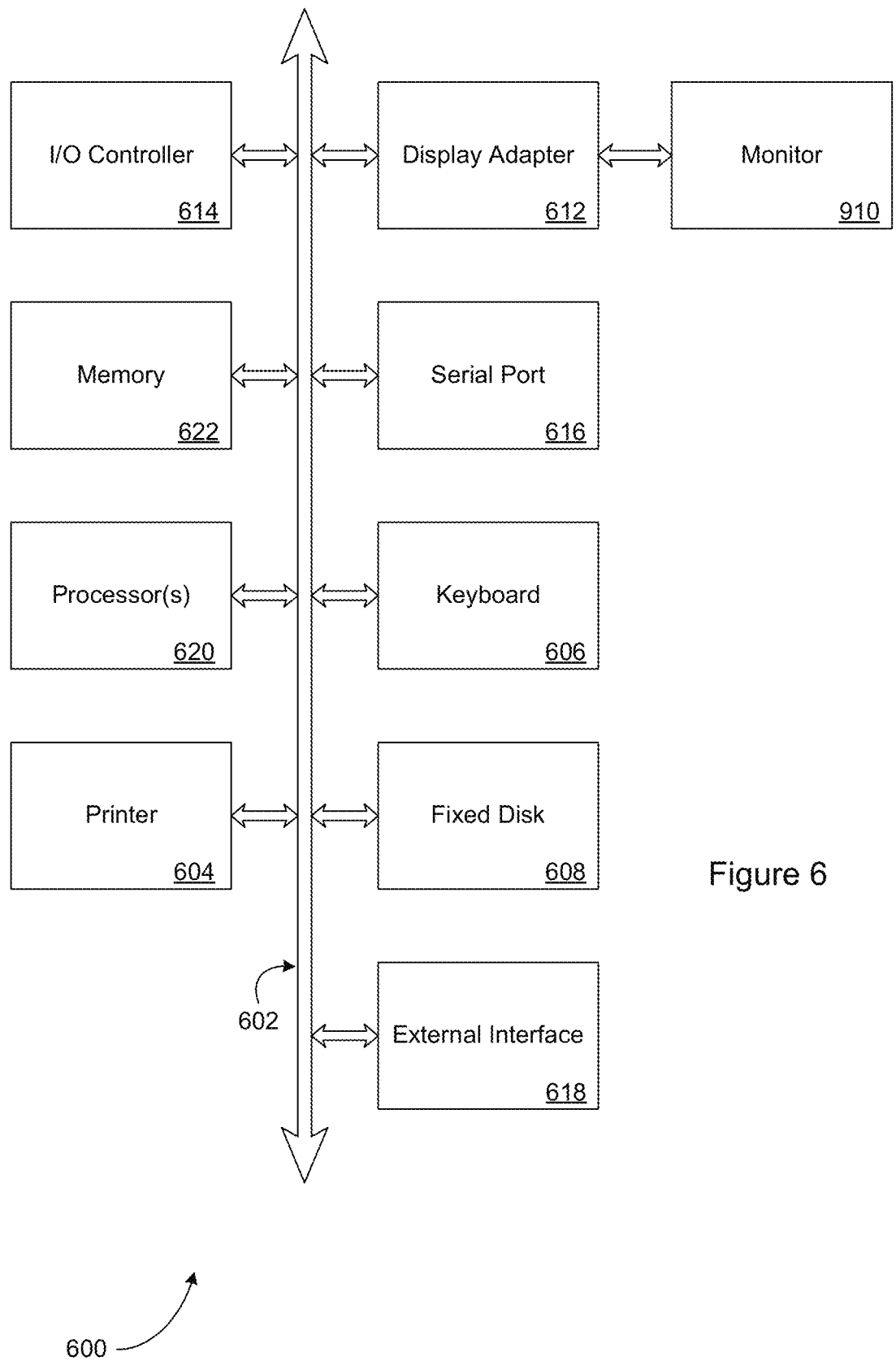
FIG. 6 is a diagram illustrating elements of an exemplary computing device or architecture suitable for implementing an embodiment of the inventive system and methods.

By way of a non-limiting example, FIG. 6 is a diagram illustrating elements of an exemplary computing device or architecture 600 suitable for implementing an embodiment of the inventive system and methods. The computer or computing device may be incorporated into a server or other data processing element that is part of a component described with reference to FIGS. 1-3. The architecture 600 includes subsystems interconnected via a system bus 602. They subsystems may include a printer 604, a keyboard 606, a fixed disk 608, and a monitor 610, which is coupled to a display adapter 612. Peripherals and input/output (I/O) devices, which couple to an I/O controller 614, can be connected to the computer system by any number of means known in the art, such as a serial port 616. For example, the serial port 616 or an external interface 618 can be utilized to connect the computer device 600 to further devices and/or systems not shown in FIG. 6 including a wide area network such as the Internet, a mouse input device, and/or a scanner. The interconnection via the system bus 602 allows one or more processors 620 to communicate with each subsystem and to control the execution of instructions that may be stored in a system memory 622 and/or the fixed disk 608, as well as the exchange of information between subsystems. The system memory 622 and/or the fixed disk 608 may embody a tangible computer-readable medium.

Figure 7:
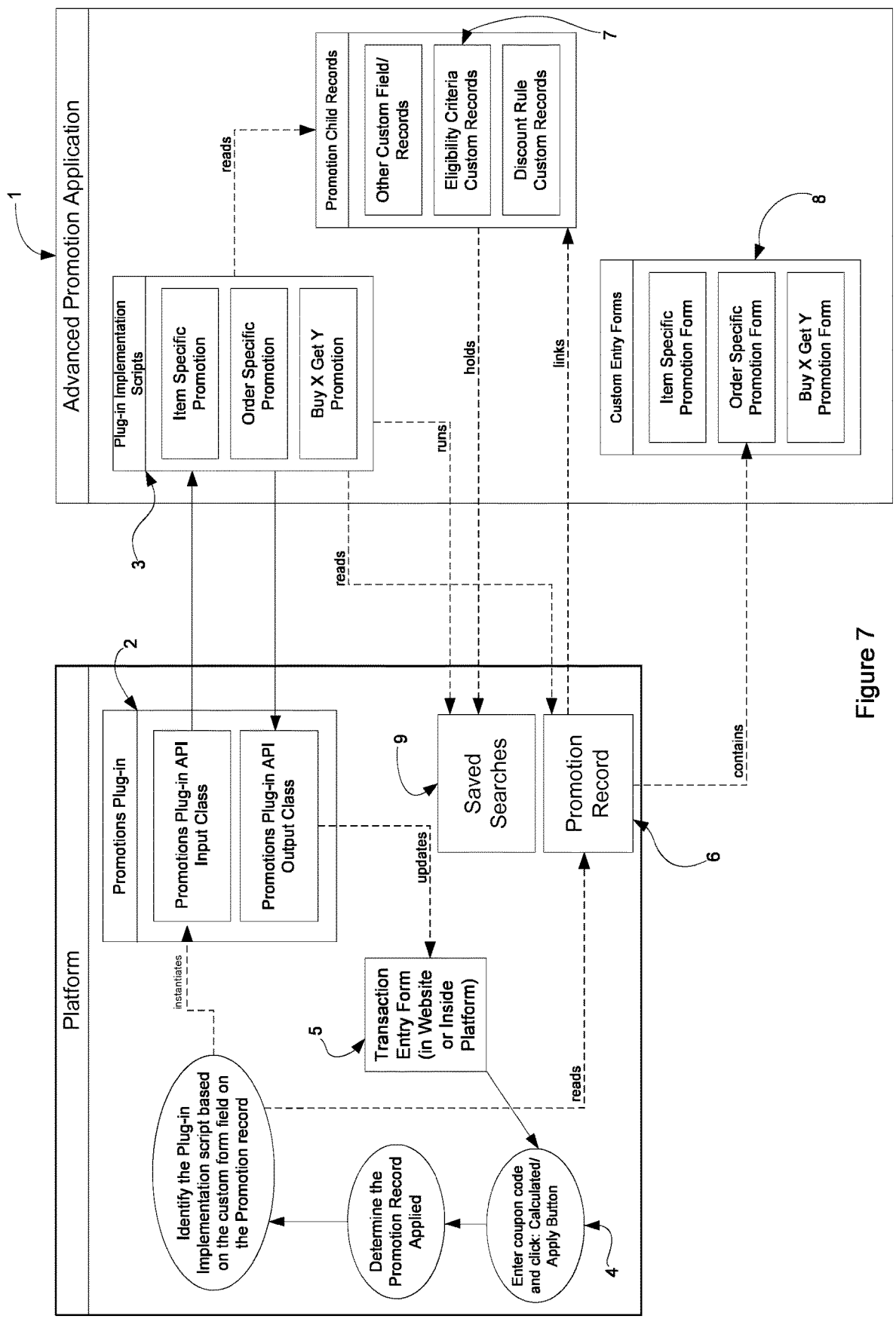
FIG. 7 is a diagram illustrating functional elements of one or more computing modules that may be used to implement an embodiment of the inventive system and methods.
Figure 8:
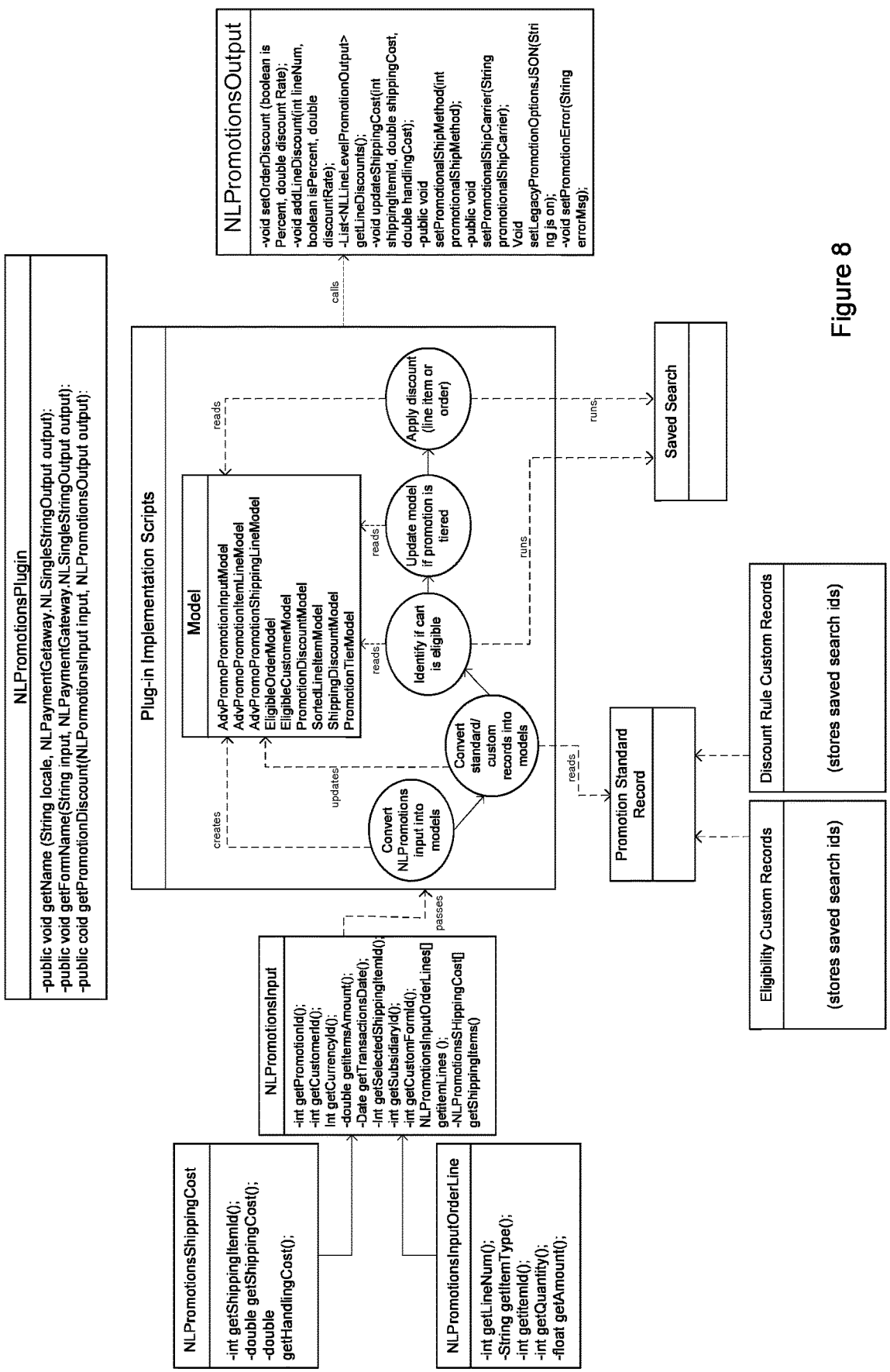
FIG. 8 a diagram illustrating programming scripts that may be used to implement one or more of the functional modules shown in FIG. 7.

FIGS. 7 and 8 illustrate aspects of one or more computing modules and processes that may be used to implement an embodiment of the invention. The exemplary modules and processes represent a possible way of implementing certain functions or operations performed by an embodiment of the invention but do not represent an exhaustive implementation or elements necessarily required for an implementation. Those of skill in the art will recognize that other methods, formats, computing structures, etc. may be used to implement an embodiment of the invention.

FIG. 7 is a diagram illustrating functional elements of one or more computing modules that may be used to implement an embodiment of the inventive system and methods. The functional modules may be implemented using any suitable programming language, techniques, or design approaches. In the description of the example implementation shown, reference is made to a platform or system (such as that described with reference to FIGS. 1-4) that may be extended by the addition of applications that extend the platform capabilities and functionality for specific industry and business needs. In one embodiment, the extension applications run inside the platform environment, hosted on the same servers and using the same database as used to store a user's data. The Advanced Promotion Application (module 1 of the figure) is a collection of files, scripts, and other customization objects that allow a user or administrator to create complex promotions that offer order-level, line-level, and buy X, get Y types of discounts (among others), based on a saved search that references dynamic customer/business data. If desired, such an application may be implemented externally to the platform using any suitable methods, data formats etc., such as a code library, JAR file, DLL, or an installer file.

In one embodiment, the platform supports plug-ins and may provide different types of plug-ins with access to different functional capabilities and operating methods (where it is understood that a plug-in is a software component that adds a specific feature to an existing software application or platform). In one embodiment, the platform supports introduction of a plug-in type exemplified by the Promotions Plug-in (module 2) that provides an interface to the core feature or data (i.e., information on a Sales Order, Cash Sale, Shopping Cart, etc.) and that includes fields that are used for one or more of defining a promotion, determining eligibility for the promotion, and methods of applying the promotion. When an application supports plug-ins, it enables user or administrator customization; in the present example, the customization of how a promotion would operate is facilitated by placing the rules and logic in one or more Plug-in Implementation scripts (module 3), where a Plug-in Implementation script is typically triggered by an event (e.g., a click of a button or other user interaction with a display). In this example, Promotion Plug-in Implementation scripts are used by the internal Promotion Engine and are executed when a user applies the promotion code by entering a coupon code and then clicking/activating the Apply button (module 4) in the shopping cart or other applicable transaction input screen (module 5). Note that application of a promotion may also be caused by other methods, such as a Platform process recognizing certain characteristics of the user or the user's proposed purchases, etc.

A Promotion record (module 6) represents stored information or a table entry in a database server that is part of the infrastructure for the platform. A Child record (module 7) represents additional information that is related to the Promotion record (e.g., discount rules, eligibility criteria, etc.). When creating a Promotion record, a data input screen may be used to create, update, or delete applicable rules and criteria. In one embodiment, this data input screen is implemented via Entry Forms (module 8), where Entry Forms may be customized and stored in the promotion record. Because of the wide variety of types of promotions, having one user interface that will cover all types and cases of promotions may not be an ideal approach. Instead, in one embodiment, different types of promotions may be created using different custom forms, with each such form associated with a promotion record and used to apply a set of rules or conditions that are desired for that type or category of promotion. When a new promotion is created, a user will typically select the Promotion Type and then be forwarded to the correctly-customized data input screen(s). In one embodiment, the Advanced Promotion Application (module 1) contains custom entry forms, plug-in implementation scripts, and other records that support three generic promotion types: Item-based, Order-based, or Buy X Get Y.

A Saved Search (module 9) represents a complex SQL query that is also stored in the database as a record. A Saved Search can be used by the Plug-in Implementation scripts during promotion eligibility checking and discount application, depending on the promotion characteristics (e.g., Buy 5 T-shirts (a Saved Search), get 2 free (same Saved Search)).

FIG. 8 a diagram illustrating programming scripts that may be used to implement one or more of the functional modules shown in FIG. 7. FIG. 8 illustrates example "scripts" that may be used to implement one or more functions or processes implemented by the Plug-In module, as illustrated by modules 2 and 3 of FIG. 7.

The module labeled "Plug-in Implementation Scripts" in FIG. 8 contains scripts for implementing processes to determine if the state of a "shopping cart" (where the "state" may include information on a customer, the type and quantity of items in the cart, the current date, etc.) is eligible for a discount or discounts, and whether to apply a discount to the contents of the cart. In one embodiment, in order to define a promotion using a Promotion Type Plug-in Script, the creator of the promotion provides the inputs for the following functions:

getName( )
getFormName( )
getPromotionDiscount( ) where getName( ) is used by the Promotion Plug-in engine to show the text to display the promotion type (i.e., Item-Based Promotions, Order-Based Promotions, Buy X, Get Y Promotions);

getFormName( ) is used to identify the name of the Custom Entry Form for a given promotion type; and getPromotionDiscount( ) is used to determine which discounts to apply to a shopping cart.

Note that in one embodiment, much of the logic for eligibility checking and discount application may be included as part of the getPromotionDiscount( ) function. In one embodiment, this function has two parameters: (a) promotionsInput and (b) promotionsOutput, where promotionsInput is of type NLPromotionsInput and promotionsOutput is of type NLPromotionsOutput. These are classes that may be provided by the Promotion Type Plug-in. FIG. 8 diagram shows the available functions for both classes in greater detail.

In general, a Promotion Type Plug-in implementation script has access to certain information about the current state of a customer's shopping cart (e.g., customer ID, promotion ID, what are the items in the cart, the shipping method selected, etc.) as well as the capability to update certain aspects of the current state of the cart (e.g., to apply a line-level discount, to apply an order discount, to alter the estimated shipping cost, etc.). A developer or promotion creator can provide a description of the logic used for each decision/modification and/or the changes can be implemented given the defined input and output classes. In one embodiment, the Advanced Promotion Application (module 1 of FIG. 7), may use the following logical framework and rules/conditions:

(a) the standard promotion record is extended to have child records in order to store and associate the eligibility criteria and discount rule for a given promotion;

(b) at the start of the getPromotionDiscount( ) function, information from NLPromotionsInput is extracted and placed in a temporary data structure—this is to improve performance and minimize script usage;

(c) given the promotion ID (the current promotion record) from NLPromotionsInput, the related child records are queried and the results are placed in the temporary data structure—this is to improve performance and minimize database queries;

(d) using the temporary data structure, the process determines if the information about the current state of the cart indicates that it is eligible for a promotion based on the current promotion record's information (note that checking on whether the promotion is tiered or not may be done on this stage); and (e) using the temporary data structure, the process determines what type of discount should be applied to the shopping cart/customer based on the current promotion record's information—the functions in the NLPromotionsOutput may be used to update the cart.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++, or Perl, using, for example, conventional or object-oriented techniques. The software code may be stored as a series of instructions, or commands on a computer readable medium, such as a random access memory (RAM) a read-only memory (ROM), a magnetic medium such as a hard-drive, a solid-state device such as a flash memory drive, or an optical medium such as a CD-ROM. Any such computer readable medium may reside on or within a single computational apparatus, and may be present on or within different computational apparatuses within a system or network.

Exemplary embodiments of the present methods and systems have been described in detail above and in the accompanying figures for illustrative purposes. However, the scope of the present methods and systems are defined by the claims below and is not limited to the embodiments described above or depicted in the figures. Embodiments differing from those described and shown herein, but still within the scope of the defined methods and systems are envisioned by the inventors and will be apparent to persons having ordinary skill in the relevant art in view of this specification as a whole. The inventors intend for the defined methods and systems to be practiced other than as explicitly described herein. Accordingly, the defined methods and systems encompass all modifications and equivalents of the subject matter as permitted by applicable law.

What is claimed is:

1. A method of providing a promotional offer for a customer, comprising:

providing content to a tenant terminal, wherein the content is for a user interface configured to receive conditions that are to be satisfied by the customer for the customer to be eligible for the promotional offer, wherein the conditions define a customer's eligibility for the promotional offer in terms of:

an item to be placed in a customer's shopping cart, wherein the customer's shopping cart is to be created by a customer terminal operated by the customer;

one or more sources of business related data to be used to determine the customer's eligibility for the offer, wherein the business related data is maintained by a plurality of integrated business systems of a multi-tenant platform;

one or more values that the business related data from each of the sources of business related data is to have for the customer to be eligible for the promotional offer; and one or more logical relations between the sources of business related data and the one or more values of the business related data to be satisfied for the customer to be eligible for the promotional offer; and generate a set of instructions that are executable to control application of the promotional offer, and store the set of instructions in the data storage system of the multi-tenant platform, wherein the set of instructions, when executed, cause one or more processors participating in a transaction involving the item to:

obtain the business related data from the plurality of integrated business systems of the multi-tenant platform, identify the item in the customer's shopping cart prior to the customer completing a payment transaction for the item, determine the one or more values of the business related data to be used to determine eligibility for the offer, determine if the customer is eligible for the promotional offer by evaluating the one or more logical relations between sources of the business related data and the one or more values of the business related data, and in response to determining that the customer is eligible for the promotional offer, control transmission of the promotional offer to be applied to the item in the customer's shopping cart presented by the customer terminal.

2. The method of claim 1, wherein the one or more sources of business related data include ERP data, CRM data, eCommerce data, and customer profile data.

3. The method of claim 1, wherein the promotional offer depends on a combination of data from more than one of the one or more sources of business related data.

4. The method of claim 1, wherein the one or more values of the business related data comprises a real-time or a pseudo real-time value of the business related data.

5. The method of claim 4, wherein the real-time or the pseudo real-time value of the business related data is determined by accessing the data storage system of the multi-tenant platform.

6. The method of claim 1, wherein to apply the promotional offer to the item in the customer's shopping cart, the set of instructions, when executed, causes the one or more processors to:

provide a promotion code or identifier to the customer terminal; and receive the provided code or identifier entered into the user interface by the customer prior to completing the payment transaction.

7. The method of claim 2, wherein the customer profile data includes information about one or more of the customer's previous purchases, the customer's demographics, or the customer's browsing behavior.

8. An integrated business system for enabling a user to define a promotional offer for a customer, comprising:

one or more business related data processing applications installed in the integrated business system in a multi-tenant platform and accessible by a plurality of tenant terminals of the multi-tenant platform;

a non-transitory data storage system accessible by the one or more business related data processing applications;

one or more processors programmed with a set of instructions, wherein when executed by the one or more processors the instructions cause the integrated business system to:

provide content to a tenant terminal, wherein the content is for a user interface configured to receive conditions that are to be satisfied by the customer for the customer to be eligible for the promotional offer, wherein the conditions define a customer's eligibility for the promotional offer in terms of one or more of:

an item to be placed in a customer's shopping cart, wherein the customer's shopping cart is to be created by a customer terminal operated by the customer;

one or more sources of business related data used to determine eligibility for the offer, wherein the business related data is stored in the data storage system for a plurality of integrated business systems of the multi-tenant platform;

one or more values that the business related data from each of the sources of business related data is to have for the customer to be eligible for the promotional offer; and one or more logical relations between the sources of business related data and the one or more values of the business related data to be satisfied for the customer to be eligible for the promotional offer; and generate a set of instructions that are executable to control application of the promotional offer, and store the set of instructions in the data storage system of the multi-tenant platform, wherein the set of instructions, when executed, cause one or more processors participating in a transaction involving the item to:

obtain the business related data from the plurality of integrated business systems of the multi-tenant platform, identify the item in the customer's shopping cart prior to the customer completing a payment transaction for the item;

determine the one or more values of the business related data obtained from the sources of business related data;

determine if the customer is eligible for the promotional offer by evaluating the one or more logical relations between the sources of the business related data and the one or more values of the business related data; and in response to a determination that the customer is eligible for the promotional offer, control transmission of the promotional offer to the customer terminal to be applied to the item in the customer's shopping cart.

9. The system of claim 8 wherein the one or more sources of business related data include ERP data, CRM data, eCommerce data, and customer profile data.

10. The system of claim 8, wherein the promotional offer depends on a combination of more than one of the one or more sources of business related data.

11. The system of claim 8, wherein the one or more values of the business related data include a real-time or a pseudo real-time value of the one or more sources of business related data.

12. The system of claim 11, wherein the real-time or the pseudo real-time value of the one or more sources of business related data is obtained from the data storage system of the multi-tenant platform.

13. The system of claim 8, wherein, to apply the promotional offer to the item in the customer's shopping cart, the instructions, when executed, cause the one or more processors to:

provide a promotion code or identifier to the customer; and receive the provided code or identifier from the customer prior to completion of the payment transaction.

14. The system of claim 9, wherein the customer profile data includes information about one or more of the customer's previous purchases, the customer's demographics, or the customer's browsing behavior.

\* \* \* \* \*